United States Patent
Song et al.

(10) Patent No.: US 7,665,006 B2
(45) Date of Patent: Feb. 16, 2010

(54) BLOCK CODE ERROR CORRECTING SYSTEM AND METHOD

(75) Inventors: Fong-Hwa Song, Tucheng (TW); Wen-Chun Feng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 744 days.

(21) Appl. No.: 11/523,542

(22) Filed: Sep. 20, 2006

(65) Prior Publication Data

US 2007/0070839 A1   Mar. 29, 2007

(30) Foreign Application Priority Data

Sep. 26, 2005   (TW) .................................. 94133368

(51) Int. Cl.
*H03M 13/00*   (2006.01)

(52) U.S. Cl. ..................... 714/752; 341/59; 341/162; 369/44.32; 369/53.12

(58) Field of Classification Search ................. 714/752; 341/59, 162; 369/44.32, 53.12
See application file for complete search history.

(56) References Cited

U.S. PATENT DOCUMENTS

| 6,112,324 | A  | * | 8/2000 | Howe et al. ............... 714/763 |
| 6,511,280 | B1 | * | 1/2003 | Sammartino et al. ........ 414/784 |
| 2004/0194003 | A1 | * | 9/2004 | Kwon ....................... 714/790 |
| 2006/0077822 | A1 | * | 4/2006 | Kim .......................... 369/47.2 |

* cited by examiner

*Primary Examiner*—Guy J Lamarre
(74) *Attorney, Agent, or Firm*—Bacon & Thomas, PLLC

(57) ABSTRACT

A block code error correcting system is used in a compact disk reading system to increase the decoding capability of the compact disk reading system. The system includes a data slicer, a data bit to channel bit modulation pulse width determinator, a demodulator, an erase address detector and an error correction code (ECC) decoder. A pulse width of an eight-to-sixteen modulation (EFM+) signal is detected to thereby produce an erase control signal when the pulse width of the EFM+ signal is in a predefined window or is an illegal pulse width. A codeword corresponding to the EFM+ signal is set as an erasure, and accordingly an erase address is produced.

14 Claims, 5 Drawing Sheets

BLOCK CODE ERROR CORRECTING SYSTEM AND METHOD

BACKGROUND OF THE INVENTION

1. Field of the Invention

The invention relates to the block code error correction and, more particularly, to a block code error correcting system and method for a compact disk (CD) drive.

2. Description of Related Art

Data for transferring and storing in a digital versatile disk (DVD) system is easily affected by external factors (such as a scratch or dirty fingerprint on a DVD) or the misalignment of an access equipment to thus damage data. Many techniques of coding have been developed to reduce the possibility of data error. Error Correction Code (ECC) is a generic term for error coding correction, which adds redundancy information to original data to form codeword for writing in a storage device later. When the codeword stored in the storage device is read, it is important to be able to convert the codeword back to the original data. With the redundancy information in the codeword, a reading equipment can realize the original data better and thus obtain data more reliable after a special decoding procedure is performed.

In addition to assuring accurate data for the development object of ECC, a low-complicated decoder is another important issue of system implementation. In general, block code decoding is relatively easy and thus is commonly used in disk type storage. Among various ECCs, Reed-Solomon code is known to have better error correction capability, wherein algebraic structure implied in codeword thereof can be implemented in a decoder easily. Because a DVD has relatively higher physical density on data storage and thus more data stored on the DVD is affected in case of damage, a DVD system needs enhanced capability of error correction. In order to obtain good error correction performance and low-complicated decoder, general DVD systems adopt Reed-Solomon Product Code (RSPC).

FIG. 1 is a coding block format according to the DVD specification. In FIG. 1, a data frame is a matrix with a width of 12 bytes and a length of 172 bytes, and an error correction code (ECC) block is a matrix with a width of 208 bytes and a length of 182 bytes, which is formed by stacking up 16 data frames plus corresponding redundancy blocks.

The decoding procedure is opposite to its coding procedure. The row parities are used to decode corresponding rows first and then the column parities are used to decode corresponding columns. Row coding/decoding blocks closer to communication media are referred to as inner codes and their parities are referred to as an inner parity (PI) each. On the other hand, column coding/decoding blocks are referred to as outer codes and their parities are referred to as an outer parity (PO) each.

FIG. 2 is a block diagram of a typical block code error correcting system in a CD reading system. As shown in FIG. 2, a data slicer 210 samples an RF signal according to a sampling clock T and produces an eight-to-sixteen modulation signal, i.e., EFM+ signal. When the RF signal has a significant jitter, an error EFM+ signal is produced. A demodulator 220 produces an error codeword according to the error EFM+ signal and sends the error codeword to an ECC decoder 240, which causes a misjudgement to further lead the ECC decoder 240 to have a poor decoding efficiency. Therefore, it is desirable to provide an improved block code error correcting system to mitigate and/or obviate the aforementioned problems.

SUMMARY OF THE INVENTION

The object of the invention is to provide a block code error correcting system, which can eliminate the error EFM+ signal produced when the RF signal has the significant jitter and further overcome the poor decoding efficiency encountered in the typical block code error correcting system of the CD drive.

According to one aspect of the invention, a block code error correcting system is provided, which includes an error correction code (ECC) block consisting of plural data entries arranged in rows and columns. The system includes a data slicer, a data bit to channel bit modulation pulse width determinator, a demodulator and an erase address detector. The data slicer receives a radio frequency (RF) signal and samples the RF signal according to a sampling clock to thus produce a data bit to channel bit modulation signal. The data bit to channel bit modulation pulse width determinator is connected to the data slicer in order to detect a pulse width of the data bit to channel bit modulation signal to thus produce an erase control signal when the pulse width of the data bit to channel bit modulation signal is illegal or in a predefined window. The demodulator is connected to the data bit to channel bit modulation pulse width determinator in order to receive and decode the data bit to channel bit modulation signal to thus produce a codeword. The erase address detector is coupled to the data bit to channel bit modulation pulse width determinator and the demodulator in order to set the code word corresponding to the data bit to channel bit modulation signal as an erase according to the erase control signal to thus output an erase address.

According to another aspect of the invention, a block code error correcting method is provided, which includes an error correction code (ECC) block consisting of plural data entries arranged in rows and columns. The method includes a data slicing step, a data bit to channel bit modulation pulse width determining step, a demodulating step and an erase address detecting step. The data slicing step receives a radio frequency (RF) signal and samples the RF signal according to a sampling clock to thus produce a data bit to channel bit modulation signal. The data bit to channel bit modulation pulse width determining step detects a pulse width of the data bit to channel bit modulation signal to thus produce an erase control signal when the pulse width of the data bit to channel bit modulation signal is an illegal pulse width or in a predefined window width. The demodulating step receives and decodes the data bit to channel bit modulation signal to thus produce a codeword. The erase address detecting step sets the code word corresponding to the data bit to channel bit modulation signal as an erase according to the erase control signal to thus output an erase address.

Other objects, advantages, and novel features of the invention will become more apparent from the following detailed description when taken in conjunction with the accompanying drawings.

DETAILED DESCRIPTION OF THE PREFERRED EMBODIMENT

The invention provides a block code error correcting system, which is used in a compact disk reading system to increase its decoding capability and which can eliminate an error data bit to channel bit modulation signal produced when the RF signal has a significant jitter. The data bit to channel bit modulation signal is an eight-to-fourteen modulation (EFM) signal in compact disks (CDs), and an eight-to-sixteen modulation signal in digital versatile disks (DVDs). In this embodiment, an example of the eight-to-sixteen modulation signal in a digital versatile disk (DVD) is given for illustrative purpose only. A preferred embodiment or modification of the eight-to-fourteen modulation (EFM) signal in a CD can easily be implemented by those skilled in the prior according to the claims which define the scope and its equivalence of the invention.

A pulse width W of an EFM+ signal is detected to thereby produce an erase control signal when the pulse width of the EFM+ signal is in a predefined window width or is illegal, such that a codeword corresponding to the EFM+ signal is set as an erase and an erase address is produced. Accordingly, an error correction code decoder can decode the EFM+ signal according to the codeword and the erase address. Due to the codeword is set as an erasure, the decoding capability is effectively increased.

Figure 1:
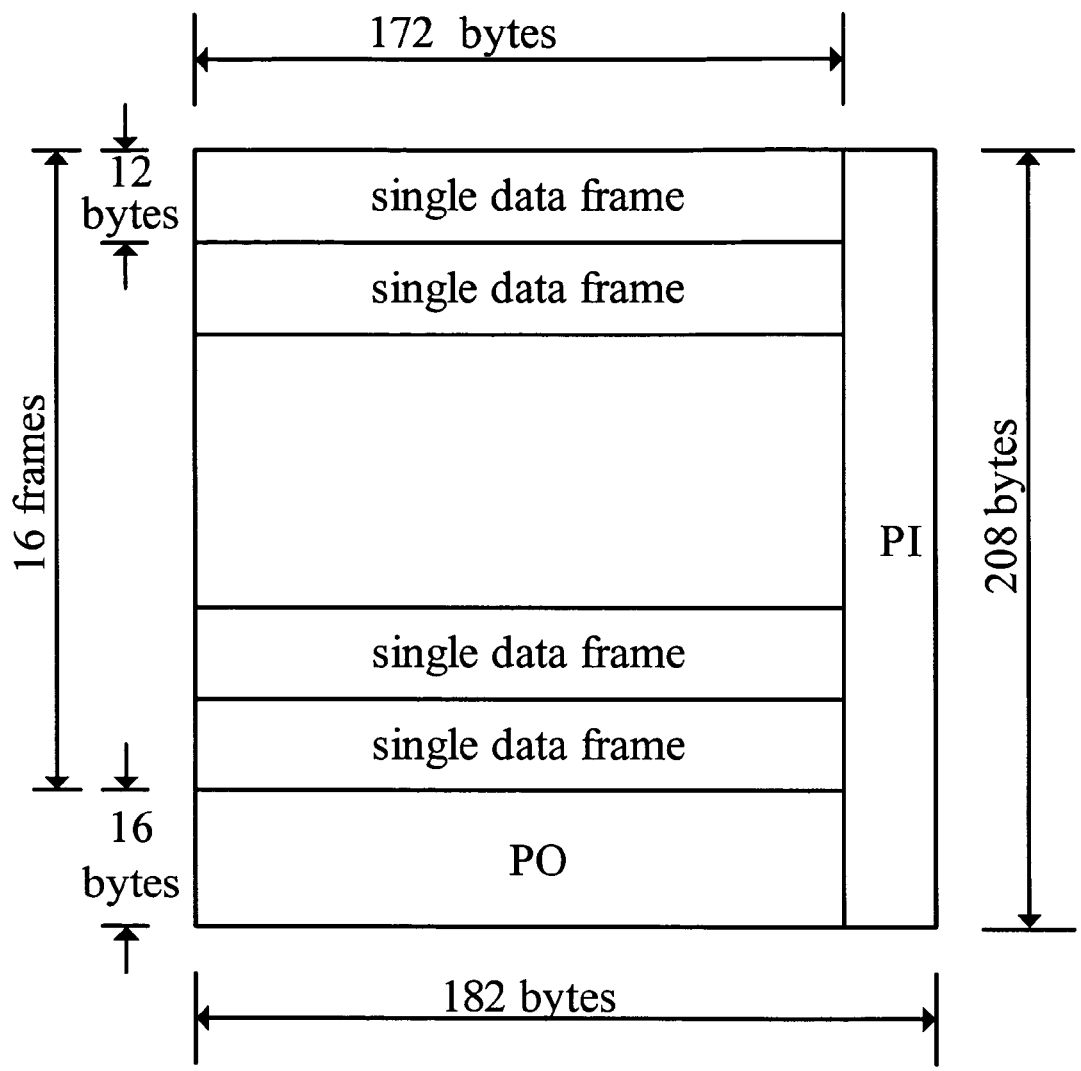
FIG. 1 is a coding block format published by DVD specification.
Figure 2:
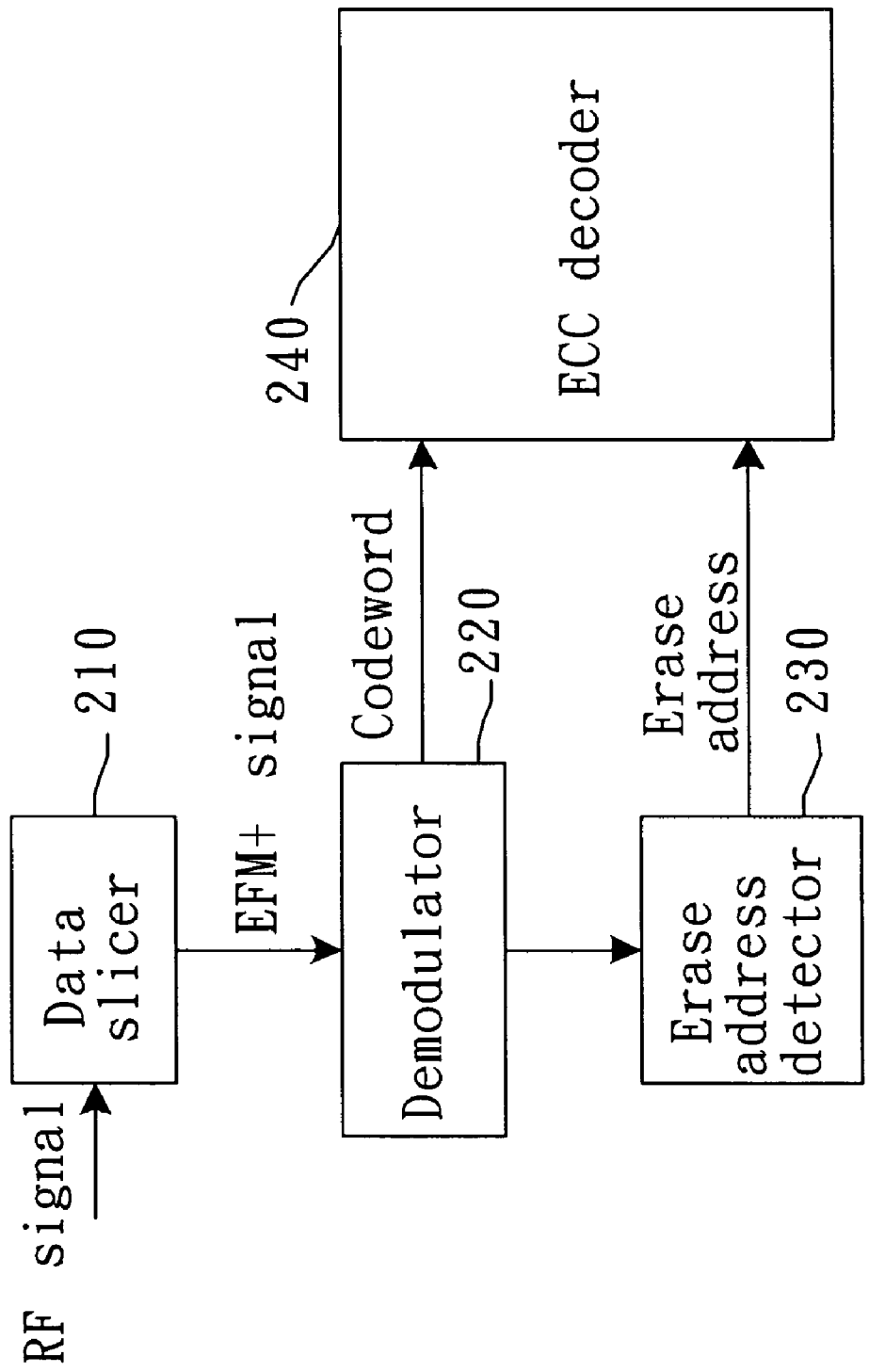
FIG. 2 is a block diagram of a typical block code error correcting system in a CD reading system.
Figure 3:
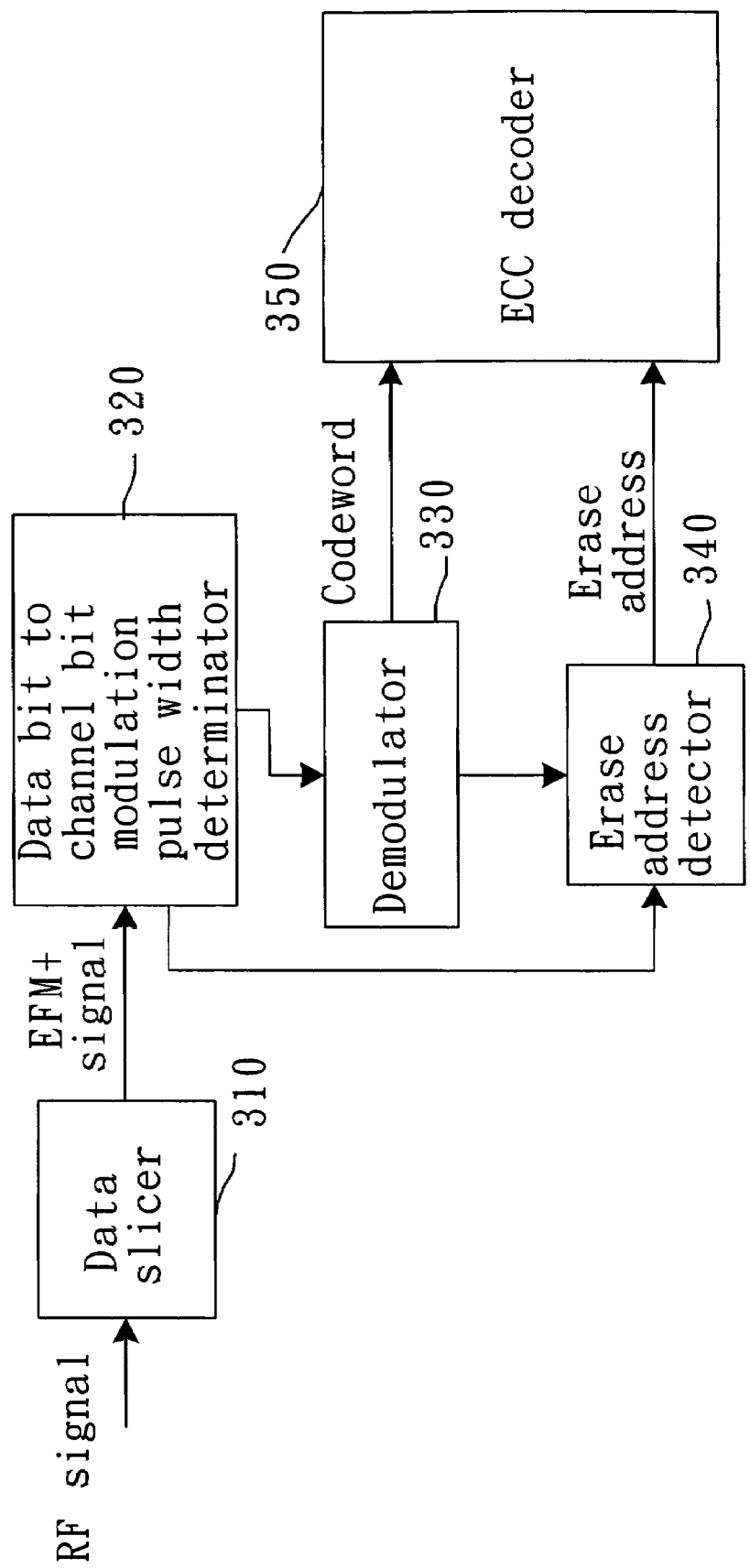
FIG. 3 is a block diagram of a block code error correcting system in a CD reading system according to the invention.

FIG. 3 is a block diagram of a block code error correcting system in a CD reading system according to the invention. As shown in FIG. 3, the system includes a data slicer 310, a data bit to channel bit modulation pulse width determinator 320, a demodulator 330, an erase address detector 340 and an ECC decoder 350.

The data slicer 310 receives a radio frequency (RF) signal and samples the RF signal according to a sampling clock T to thus produce an EFM+ signal. According to the DVD standard, a pulse width W of the EFM+ signal should be three to eleven sampling clocks, i.e., 3T to 11T. When the pulse width W is smaller than 3T or greater than 11T, it indicates that the pulse width W is an illegal pulse width. Namely, the RF signal received by the data slicer 310 has a significant jitter.

The data bit to channel bit modulation pulse width determinator 320 is connected to the data slicer 310 in order to detect the pulse width W of the EFM+ signal. The data bit to channel bit modulation pulse width determinator 320 determines if the pulse width W of the EFM+ signal is an illegal pulse width. When the pulse width W is smaller than 3T or greater than 11T, the data bit to channel bit modulation pulse width determinator 320 produces an erase control signal.

When the pulse width W is determined as a legal pulse width, i.e., $3T \leq W \leq 11T$, the data bit to channel bit modulation pulse width determinator 320 further determines if the EFM+ signal is in a predefined window. When the EFM+ signal is in the predefined window, the data bit to channel bit modulation pulse width determinator 320 produces an erase control signal.

The data bit to channel bit modulation pulse width determinator 320 uses a signal CLK10 to sample the EFM+ signal for determining whether the EFM+ signal is in the predefined window. In this case, a frequency of the signal CLK10 is ten times the frequency of the sampling clock T. The predefined window has a width of dT to (1−d)T, where 0<d<0.5. In this case, d is 0.3, i.e., $0.3T \leq $ window width $\leq 0.7T$.

Figure 4:
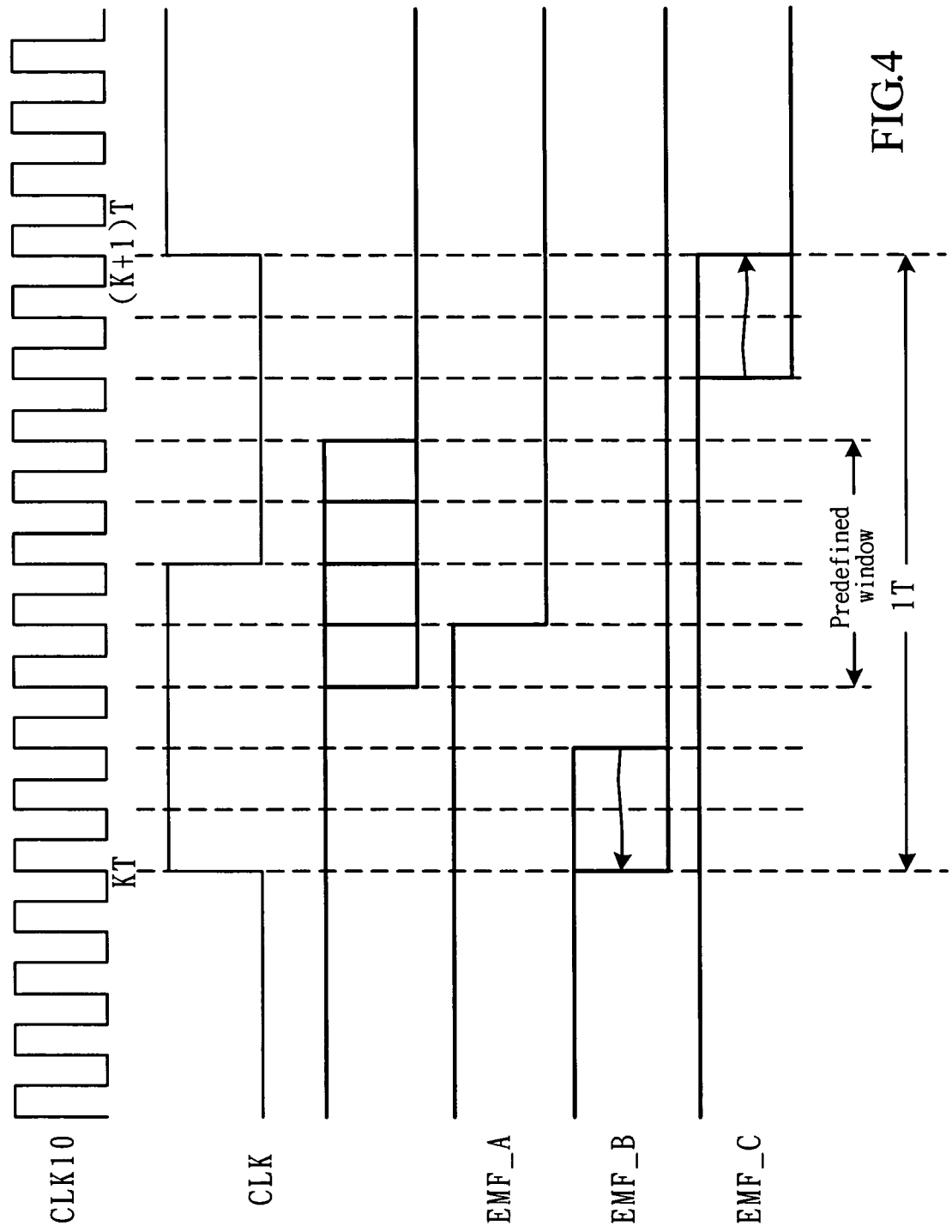
FIG. 4 is a schematic diagram of an operation of a data bit to channel bit modulation pulse width determinator according to the invention.

When the EFM+ signal is in the predefined window, the data bit to channel bit modulation pulse width determinator 320 produces the erase control signal. As shown in FIG. 4, the EFM_A signal is in the predefined window, and the data bit to channel bit modulation pulse width determinator 320 produces the erase control signal corresponding to the EFM_A signal.

When the EFM+ signal is not in the predefined window, and $KT \leq W < (K+0.3)T$, the data bit to channel bit modulation pulse width determinator 320 sets the pulse width W of the EFM+ signal to KT, where K is an integer. The EFM_B signal shown in FIG. 4 has a pulse width of (K+0.2)T, and the data bit to channel bit modulation pulse width determinator 320 sets the pulse width W of the EFM_B signal to KT.

When the EFM+ signal is not in the predefined window, and $(K+0.7)T < W \leq (K+1)T$, the data bit to channel bit modulation pulse width determinator 320 sets the pulse width W of the EFM+ signal to (K+1)T, where K is an integer. The EFM_C signal shown in FIG. 4 has a pulse width of (K+0.8)T, and the data bit to channel bit modulation pulse width determinator 320 sets the pulse width W of the EFM_C signal to (K+1)T.

The demodulator 330 is connected to the data bit to channel bit modulation pulse width determinator 320 in order to receive and decode the EFM+ signal to produce a codeword. The erase address detector 340 is connected to the data bit to channel bit modulation pulse width determinator 320 and the demodulator 330 in order to set the codeword corresponding to the EFM+ signal as an erase according to the erase control signal.

The ECC decoder 350 is connected to the demodulator 330 and the erase address detector 340 in order to perform an ECC decoding according to the codeword output by the demodulator 330 and the erase address output by the erase address detector 340.

The erase address can provide more information to the ECC decoder 350 for enhancing the decoding capability. For a DVD system, when a byte is to be read from a storage medium, the respective demodulator 330 is required. If the byte cannot be modulated properly, it indicates that the byte may carry an error data. At this point, the pulse width of the EFM+ signal is determined. When the pulse width of the EFM+ signal is determined as an illegal pulse width, the data bit to channel bit modulation pulse width determinator 320 produces an erase control signal. As such, the address of the byte is set as the erase address, and the ECC decoder 350 recognizes the byte as an error and thus only computes an amount of error for correcting the address. Theoretically, the error correction capability for the decoder recognizing the erase address is a double of that for the decoder not recognizing the erase address.

Figure 5:
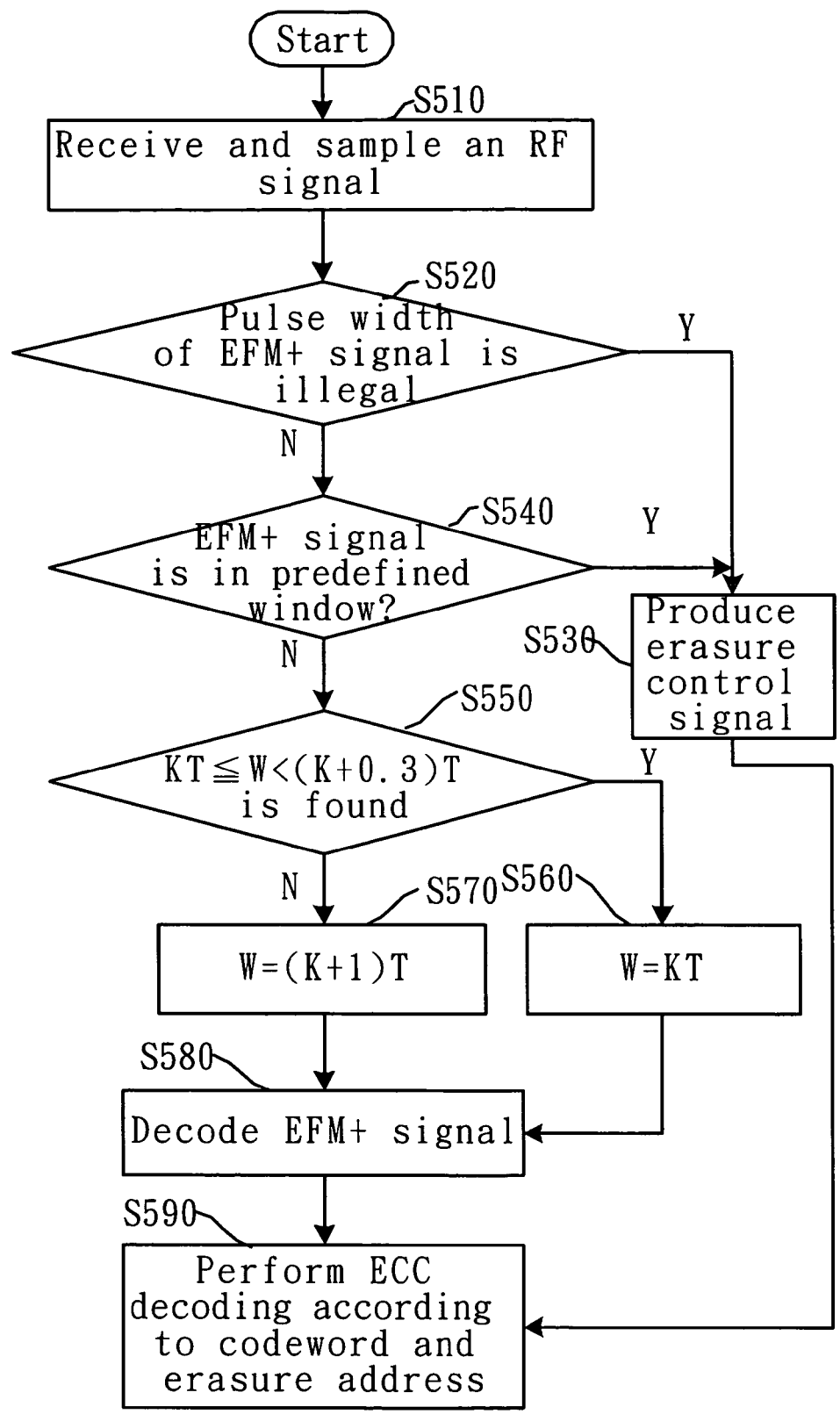
FIG. 5 is a flowchart of a block code error correcting method according to the invention.

FIG. 5 is a flowchart of a block code error correcting method according to the invention. Step S510 receives an RF signal and samples it according to a sampling clock T to thus produce an eight-to-sixteen (EFM+) signal. Step S520 determines if a pulse width of the EFM+ signal is an illegal pulse width; if yes, step S530 is executed, and otherwise step S540 is executed.

When step S530 is executed, it indicates that the pulse width of the EFM+ signal is an illegal pulse width, i.e., the pulse width of the EFM+ signal is smaller than 3T or greater than 11T, so as to produce an erase control signal and further execute step S590.

Step S540 determines if the EFM+ signal is in a predefined window; if yes, step S530 is executed, and otherwise step S550 is executed. Step S540 uses a signal CLK10 to sample the EFM+ signal in order to determine if the EFM+ signal is in the predefined window. In this case, a frequency of the signal CLK10 is 10 times the frequency of the sampling clock T. The predefined window has a width of 0.3T to 0.7T, namely, $0.3T \leq$ window width $\leq 0.7T$.

Step S550 determines if the pulse width of the EFM+ signal is greater than or equal to KT and smaller than (K+0.3)T, i.e., $KT \leq W < (K+0.3)T$, where K is an integer. When the pulse width is determined as $KT \leq W < (K+0.3)T$, step S560 is executed to set the pulse width of the EFM+ signal to KT. Conversely, when $KT \leq W < (K+0.3)T$ is not found, step S570 is executed to set the pulse width of the EFM_B signal to (K+1)T.

Step S580 decodes the EFM+ signal to produce a codeword. Step S590 sets the codeword corresponding to the EFM+ signal as an erase according to the erase control signal, and performs an ECC decoding according to the codeword and the erase address.

In view of the foregoing, it is known that, in the invention, the pulse width of the EFM+ signal is determined, and accordingly the data bit to channel bit modulation pulse width determinator 320 produces an erase control signal when the pulse width of the EFM+ signal is an illegal pulse width or in a predefined window width. Both the error EFM+ signal owing to the RF has a significant jitter and the poor decoding efficiency of the typical block code error correcting system for a CD drive are overcome.

Although the present invention has been explained in relation to its preferred embodiment, it is to be understood that many other possible modifications and variations can be made without departing from the spirit and scope of the invention as hereinafter claimed.

What is claimed is:

1. A block code error correcting system, which has an error correction code (ECC) block consisting of plural data entries arranged in rows and columns, the system comprising:
   a data slicer, which receives a radio frequency (RF) signal and samples the RF signal according to a sampling clock to thus produce a data bit to channel bit modulation signal;
   a data bit to channel bit modulation pulse width determinator, which is connected to the data slicer in order to detect a pulse width of the data bit to channel bit modulation signal to thus produce an erase control signal when the data bit to channel bit modulation signal is in a predefined window or the pulse width of the data bit to channel bit modulation signal is illegal;
   a demodulator, which is connected to the data bit to channel bit modulation pulse width determinator in order to receive and decode the data bit to channel bit modulation signal to thus produce a codeword; and
   an erase address detector, which is coupled to the data bit to channel bit modulation pulse width determinator and the demodulator in order to set the code word corresponding to the data bit to channel bit modulation signal as an erasure according to the erase control signal to thus output an erase address.

2. The system as claimed in claim 1, further comprising: an ECC decoder, which is connected to the demodulator and the erase address detector in order to perform an ECC decoding according to the codeword output by the demodulator and the erase address output by the erase address detector.

3. The system as claimed in claim 1, wherein the predefined window has a window width of dT to (1−d)T, where 0<d<0.5 and T is the sampling clock.

4. The system as claimed in claim 1, wherein the pulse width of the data bit to channel bit modulation signal is illegal when the pulse width of the data bit to channel bit modulation signal is smaller than three times the sampling clock.

5. The system as claimed in claim 4, wherein the pulse width of the data bit to channel bit modulation signal is illegal when the pulse width of the data bit to channel bit modulation signal is greater than eleven times the sampling clock.

6. The system as claimed in claim 3, wherein the data bit to channel bit modulation pulse width determinator sets the pulse width of the data bit to channel bit modulation signal as KT when the data bit to channel bit modulation signal is not in the predefined window and $KT \leq W < (K+d)T$, where K is a multiplication factor as an integer, and W is the pulse width.

7. The system as claimed in claim 3, wherein the data bit to channel bit modulation pulse width determinator sets the pulse width of the data bit to channel bit modulation signal as (K+1)T when the data bit to channel bit modulation signal is not in the predefined window and $(K+1-d)T < W \leq (K+1)T$, where K is a multiplication factor as an integer, and W is the pulse width.

8. A block code error correcting method, which has an error correction code (ECC) block consisting of plural data entries arranged in rows and columns, the method comprising:
   a data slicing step, which receives a radio frequency (RF) signal and samples the RF signal according to a sampling clock to thus produce a data bit to channel bit modulation signal;
   a data bit to channel bit modulation pulse width determining step, which detects a pulse width of the data bit to channel bit modulation signal to thus produce an erase control signal when the data bit to channel bit modulation signal is in a predefined window or the pulse width of the data bit to channel bit modulation signal is illegal;
   a demodulating step, which receives and decodes the data bit to channel bit modulation signal to thus produce a codeword; and
   an erase address detecting step, which sets the codeword corresponding to the data bit to channel bit modulation signal as an erasure according to the erase control signal to thus output an erase address.

9. The method as claimed in claim 8, further comprising: an ECC decoding step, which performs an ECC decoding according to the codeword and the erase address.

10. The method as claimed in claim 8, wherein the predefined window has a window width of dT to (1−d)T, where 0<d<0.5 and T is the sampling clock.

11. The method as claimed in claim 8, wherein the pulse width of the data bit to channel bit modulation signal is illegal when the pulse width of the data bit to channel bit modulation signal is smaller than three times the sampling clock.

12. The method as claimed in claim 11, wherein the pulse width of the data bit to channel bit modulation signal is illegal when the pulse width of the data bit to channel bit modulation signal is greater than eleven times the sampling clock.

13. The method as claimed in claim 10, wherein the data bit to channel bit modulation pulse width determinator sets the pulse width of the data bit to channel bit modulation signal as KT when the data bit to channel bit modulation signal is not in the predefined window and $KT \leq W < (K+d)T$, where K is a multiplication factor as an integer, and W is the pulse width.

14. The method as claimed in claim 10, wherein the data bit to channel bit modulation pulse width determinator sets the pulse width of the data bit to channel bit modulation signal as (K+1)T when the data bit to channel bit modulation signal is not in the predefined window and $(K+1-d)T < W \leq (K+1)T$, where K is a multiplication factor as an integer, and W is the pulse width.

* * * * *

UNITED STATES PATENT AND TRADEMARK OFFICE
CERTIFICATE OF CORRECTION

PATENT NO.        : 7,665,006 B2                          Page 1 of 1
APPLICATION NO.   : 11/523542
DATED             : February 16, 2010
INVENTOR(S)       : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Twenty-eighth Day of December, 2010

David J. Kappos
*Director of the United States Patent and Trademark Office*